United States Patent
Kumazawa et al.

(10) Patent No.: US 8,078,318 B2
(45) Date of Patent: Dec. 13, 2011

(54) APPLIANCE CONTROL APPARATUS AND METHOD

(75) Inventors: Toshimitsu Kumazawa, Kawasaki (JP); Koji Kimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 377 days.

(21) Appl. No.: 12/473,405

(22) Filed: May 28, 2009

(65) Prior Publication Data
US 2009/0299504 A1    Dec. 3, 2009

(30) Foreign Application Priority Data
May 28, 2008   (JP) ................................ 2008-139550

(51) Int. Cl.
*G06F 19/00* (2011.01)
(52) U.S. Cl. ........................................ 700/245; 700/251
(58) Field of Classification Search .................. 700/245, 700/247, 248, 251, 257, 258, 260; 318/568.16, 318/568.21; 901/2, 27
See application file for complete search history.

(56) References Cited

U.S. PATENT DOCUMENTS

| | | | | |
|---|---|---|---|---|
| 4,715,920 A * | 12/1987 | Ruppman et al. | ............. | 156/709 |
| 7,158,846 B2 * | 1/2007 | Fukatsu et al. | ................. | 700/99 |
| 7,310,571 B2 * | 12/2007 | Kumazawa et al. | .......... | 700/245 |
| 7,318,265 B2 * | 1/2008 | Takagi et al. | ................ | 29/403.1 |
| 7,778,734 B2 * | 8/2010 | Oswald et al. | ................ | 700/276 |
| 2007/0225861 A1 | 9/2007 | Kumazawa et al. | | |
| 2009/0143875 A1 | 6/2009 | Kimura et al. | | |
| 2009/0191526 A1 | 7/2009 | Kumazawa et al. | | |
| 2010/0161502 A1 | 6/2010 | Kumazawa et al. | | |

FOREIGN PATENT DOCUMENTS

| | | |
|---|---|---|
| JP | 2002-369383 | 12/2002 |
| JP | 2007-107782 | 4/2007 |
| JP | 2007-172406 | 7/2007 |
| JP | 2007-200715 | 8/2007 |
| JP | 2007-259647 | 10/2007 |

* cited by examiner

*Primary Examiner* — Kidest Bahta
(74) *Attorney, Agent, or Firm* — Turocy & Watson, LLP

(57) ABSTRACT

An appliance control apparatus acquires, at intervals of predetermined time, a state data including values of operation states of respective appliances, stores the state data as one record in a memory, to store time-series records, classifies the records in the memory into a plurality of living situation groups by clustering the records, and calculates, for each living situation group, a barycenter of each operation state, determines, for a target state data, one of the living situation groups to which the target state data belongs, determines one of the operation states whose value in the target state data is larger than corresponding barycenter in the one of the living situation groups, and determines the barycenter as a recommended value, and controls the one of operation state to the recommended value when obtaining an acceptance instruction for the recommended value.

13 Claims, 17 Drawing Sheets

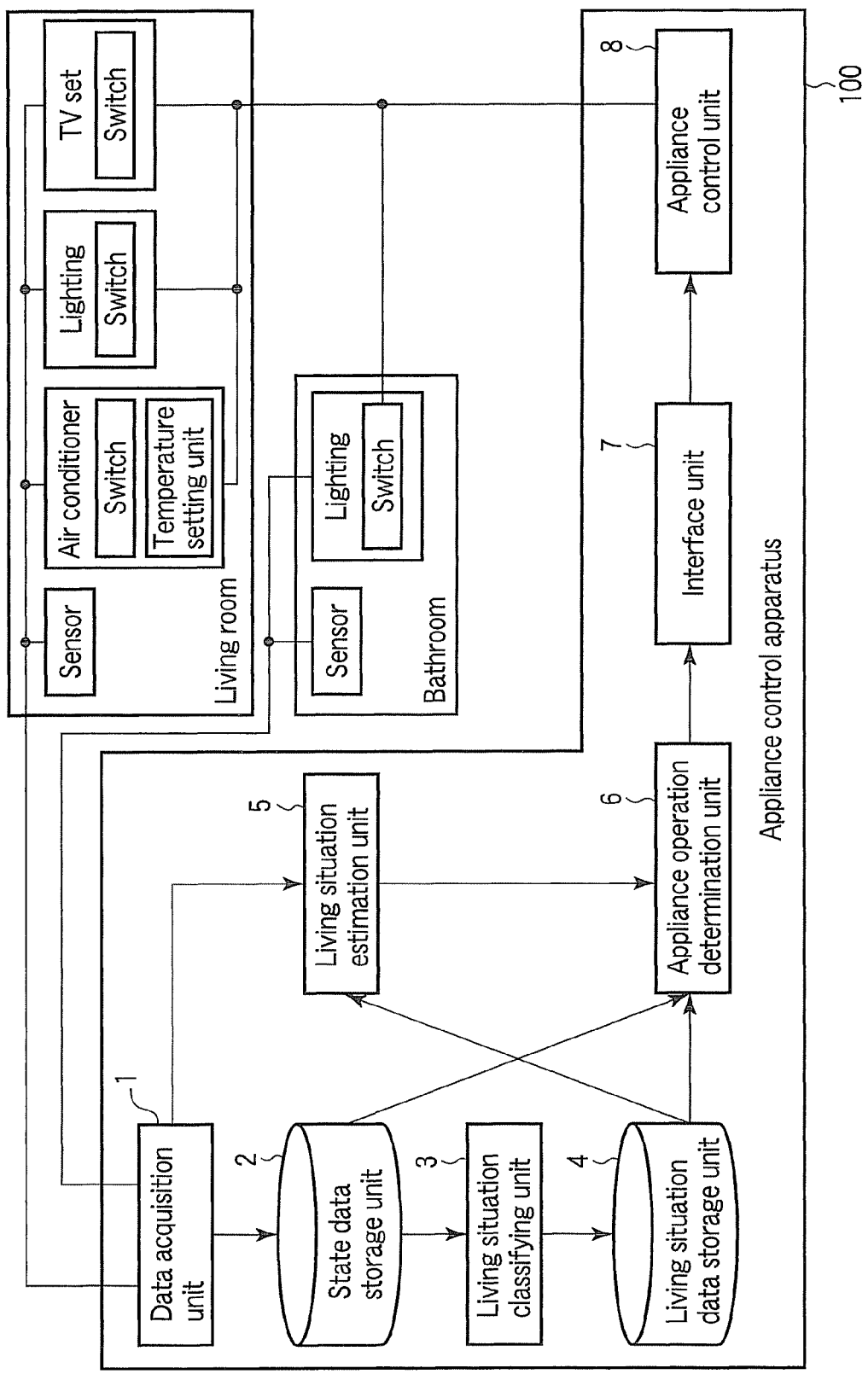
F I G. 1

| | | | | | | | | |
|---|---|---|---|---|---|---|---|---|
| Appliance operation data | ON/OFF microwave oven | 0 | 1 | ⋮ | 0 | 0 | 0 | 0 | ⋮ |
| | Open/closed state of refrigerator | 1 | 0 | ⋮ | 0 | 0 | 0 | 0 | ⋮ |
| | Washing machine mode | 0 | 0 | ⋮ | 0 | 0 | 0 | 0 | ⋮ |
| | ON/OFF of washing machine | 0 | 0 | ⋮ | 0 | 0 | 0 | 0 | ⋮ |
| | ON/OFF of TV set | 1 | 1 | ⋮ | 1 | 1 | 1 | 1 | ⋮ |
| | Temperature setting (°C) in bedroom air conditioner | 28 | 28 | ⋮ | 28 | 28 | 28 | 28 | ⋮ |
| | ON/OFF of bedroom air conditioner | 0 | 0 | ⋮ | 0 | 0 | 0 | 0 | ⋮ |
| | Temperature setting (°C) in living room air conditioner | 28 | 28 | ⋮ | 28 | 28 | 28 | 27 | ⋮ |
| | ON/OFF of living room air conditioner | 1 | 1 | ⋮ | 1 | 1 | 1 | 1 | ⋮ |
| | ON/OFF of bedroom lighting | 0 | 0 | ⋮ | 0 | 0 | 0 | 0 | ⋮ |
| | ON/OFF of restroom lighting | 0 | 0 | ⋮ | 1 | 0 | 0 | 0 | ⋮ |
| | ON/OFF of bathroom lighting | 0 | 0 | ⋮ | 0 | 0 | 1 | 1 | ⋮ |
| | ON/OFF of kitchen lighting | 1 | 1 | ⋮ | 0 | 0 | 0 | 0 | ⋮ |
| | ON/OFF of living room lighting | 1 | 1 | ⋮ | 1 | 1 | 1 | 1 | ⋮ |
| Position data | Bedroom | 0 | 0 | ⋮ | 0 | 0 | 0 | 0 | ⋮ |
| | Restroom | 0 | 0 | ⋮ | 1 | 0 | 0 | 0 | ⋮ |
| | Bathroom | 0 | 0 | ⋮ | 0 | 0 | 1 | 1 | ⋮ |
| | Kitchen | 1 | 1 | ⋮ | 0 | 0 | 0 | 0 | ⋮ |
| | Living room | 1 | 1 | ⋮ | 1 | 1 | 1 | 1 | ⋮ |
| Environmental data | Living room humidity (%) | 82 | 82 | ⋮ | 64 | 64 | 64 | 64 | ⋮ |
| | Living room temperature (°C) | 31 | 31 | ⋮ | 28 | 28 | 28 | 28 | ⋮ |
| | Time | 18:00 | 18:03 | ⋮ | 19:19 | 19:22 | 19:55 | 20:01 | ⋮ |

| | | Living situation A | | Living situation B | | Living situation C | |
|---|---|---|---|---|---|---|---|
| | | Barycenter | Variance | Barycenter | Variance | Barycenter | Variance |
| Appliance operation data | ON/OFF microwave oven | 0.50 | 0.50 | 0.00 | 0.00 | 0.00 | 0.00 |
| | Open/closed state of refrigerator | 0.50 | 0.50 | 0.00 | 0.00 | 0.00 | 0.00 |
| | Washing machine mode | 0.00 | 0.00 | 0.00 | 0.00 | 0.00 | 0.00 |
| | ON/OFF of washing machine | 0.00 | 0.00 | 0.00 | 0.00 | 0.00 | 0.00 |
| | ON/OFF of TV set | 1.00 | 0.00 | 1.00 | 0.00 | 1.00 | 0.00 |
| | Temperature setting (°C) in bedroom air conditioner | 28.0 | 0.00 | 28.0 | 0.00 | 28.0 | 0.00 |
| | ON/OFF of bedroom air conditioner | 0.00 | 0.00 | 0.00 | 0.00 | 0.00 | 0.00 |
| | Temperature setting (°C) in living room air conditioner | 28.0 | 0.00 | 28.0 | 0.00 | 27.5 | 0.50 |
| | ON/OFF of living room air conditioner | 1.00 | 0.00 | 1.00 | 0.00 | 1.00 | 0.00 |
| | ON/OFF of bedroom lighting | 0.00 | 0.00 | 0.00 | 0.00 | 0.00 | 0.00 |
| | ON/OFF of restroom lighting | 0.00 | 0.00 | 0.50 | 0.50 | 0.00 | 0.00 |
| | ON/OFF of bathroom lighting | 0.00 | 0.00 | 0.00 | 0.00 | 1.00 | 0.00 |
| | ON/OFF of kitchen lighting | 1.00 | 0.00 | 0.00 | 0.00 | 0.00 | 0.00 |
| | ON/OFF of living room lighting | 1.00 | 0.00 | 1.00 | 0.00 | 1.00 | 0.00 |
| Position data | Bedroom | 0.00 | 0.00 | 0.00 | 0.00 | 0.00 | 0.00 |
| | Restroom | 0.00 | 0.00 | 0.50 | 0.50 | 0.00 | 0.00 |
| | Bathroom | 0.00 | 0.00 | 0.00 | 0.00 | 1.00 | 0.00 |
| | Kitchen | 1.00 | 0.00 | 0.00 | 0.00 | 0.00 | 0.00 |
| | Living room | 1.00 | 0.00 | 1.00 | 0.00 | 1.00 | 0.00 |
| Environmental data | Living room humidity (%) | 82.0 | 0.00 | 64.0 | 0.00 | 64.0 | 0.00 |
| | Living room temperature (°C) | 31.0 | 0.00 | 28.0 | 0.00 | 28.0 | 0.00 |

| | | State item | | | | | | | | | | |
|---|---|---|---|---|---|---|---|---|---|---|---|---|
| | | ON/OFF of living room lighting | ON/OFF of kitchen lighting | ON/OFF of bathroom lighting | ON/OFF of restroom lighting | ON/OFF of western style room lighting | ON/OFF of Japanese style room lighting | ON/OFF of living room air conditioner | Temperature setting (°C) in living room air conditioner | ON/OFF of western style room air conditioner | Temperature setting in western style room air conditioner | ON/OFF of TV set |
| Level | Level 1 | 0 | 0 | 0 | 0 | 0 | 0 | 0 | 18 | 0 | 18 | 0 |
| | Level 2 | 1 | 1 | 1 | 1 | 1 | 1 | 1 | 19 | 1 | 19 | 1 |
| | ... | | | | | | | | ... | | ... | |
| | Level n | | | | | | | | 28 | | 28 | |
| Level count | | 2 | 2 | 2 | 2 | 2 | 2 | 2 | 10 | 2 | 10 | 2 |

FIG. 5

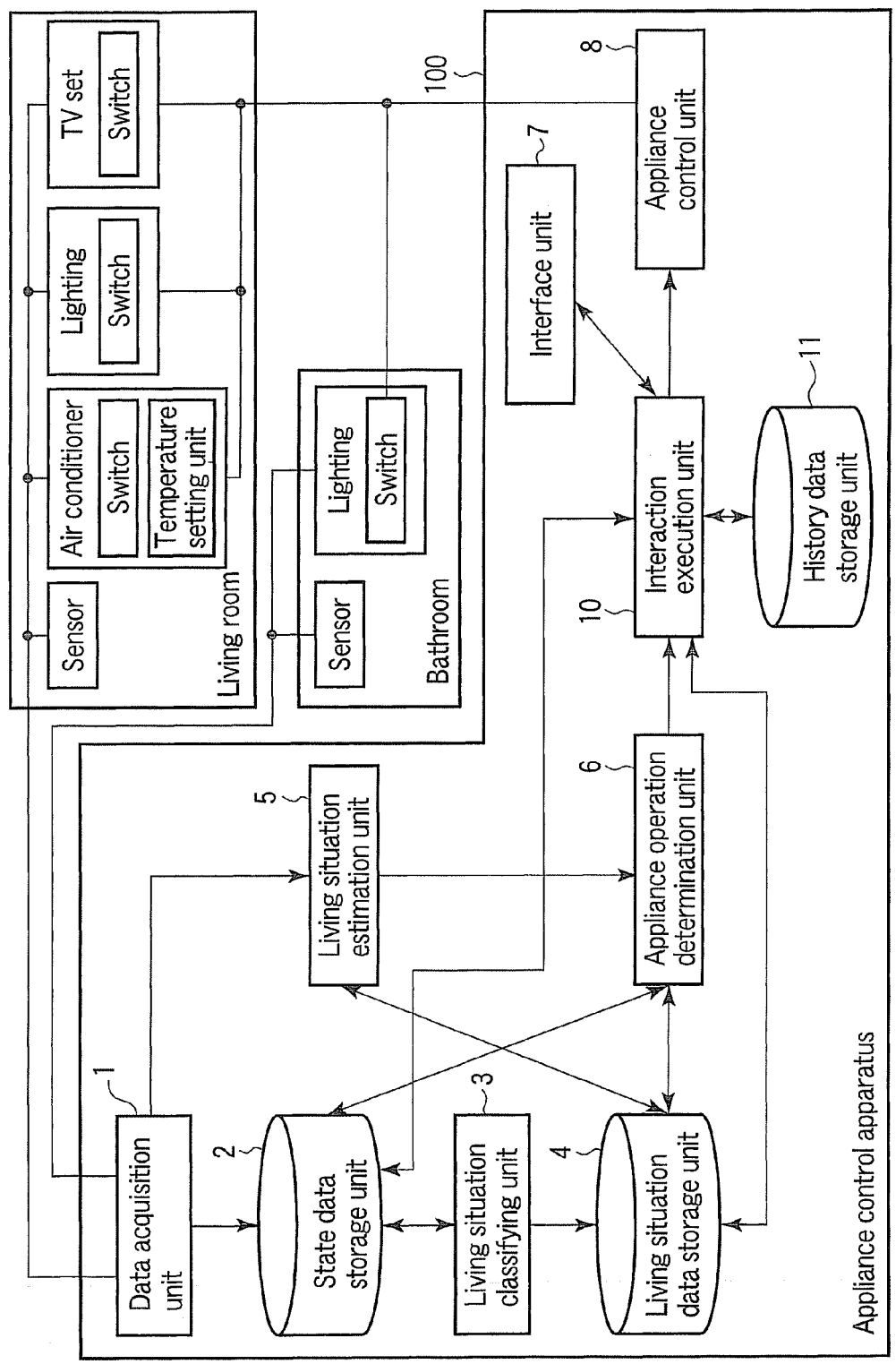
F I G. 8

| | State item | | | | | | | | | | |
|---|---|---|---|---|---|---|---|---|---|---|---|
| | ON/OFF of living room lighting | ON/OFF of kitchen lighting | ON/OFF of bathroom lighting | ON/OFF of restroom lighting | ON/OFF of western style room lighting | ON/OFF of Japanese style room lighting | ON/OFF of living room air conditioner | Temperature setting (°C) in living room air conditioner | ON/OFF of western style room air conditioner | Temperature setting in western style room air conditioner | ON/OFF of TV set |
| Proposal count | 0 | 0 | 0 | 0 | 0 | 0 | 0 | 0 | 0 | 0 | 0 |
| Acceptance count | 0 | 0 | 0 | 0 | 0 | 0 | 0 | 0 | 0 | 0 | 0 |
| Rejection count | 0 | 0 | 0 | 0 | 0 | 0 | 0 | 0 | 0 | 0 | 0 |
| Proposal flag | YES | YES | YES | YES | YES | YES | YES | YES | YES | YES | YES |
| Control flag | NO | NO | NO | NO | NO | NO | NO | NO | NO | NO | NO |

FIG. 9

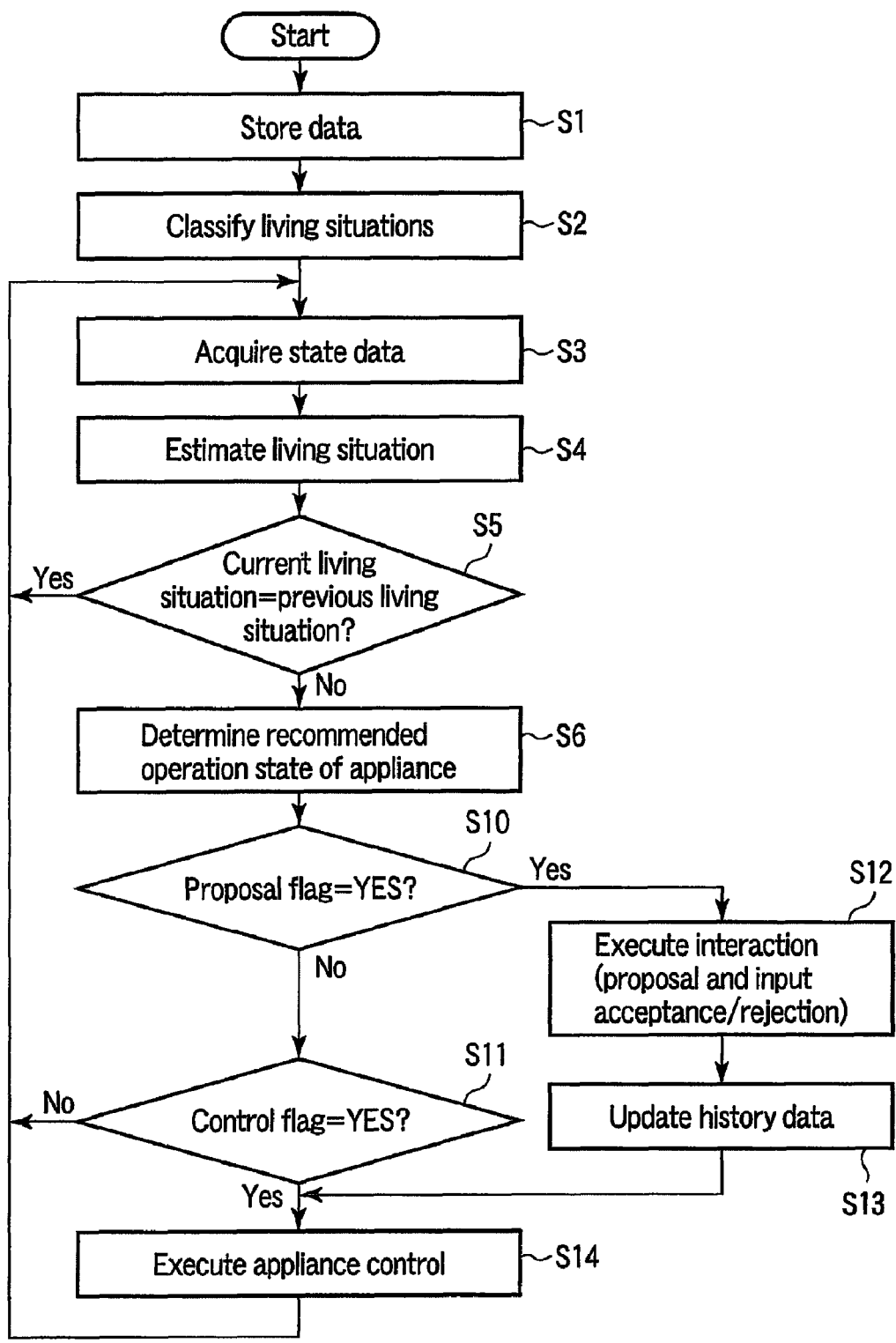
F I G. 10

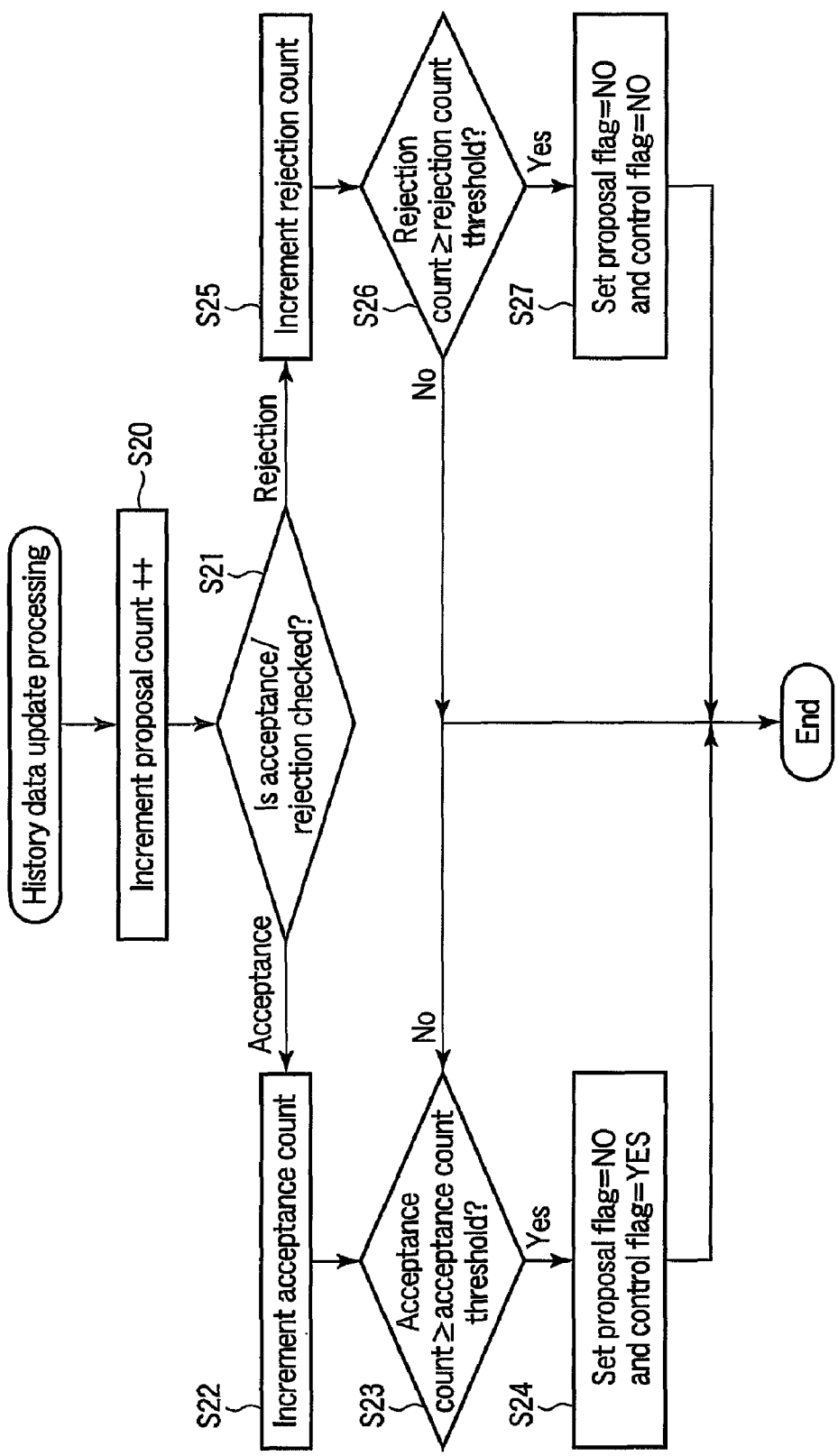
F I G. 11

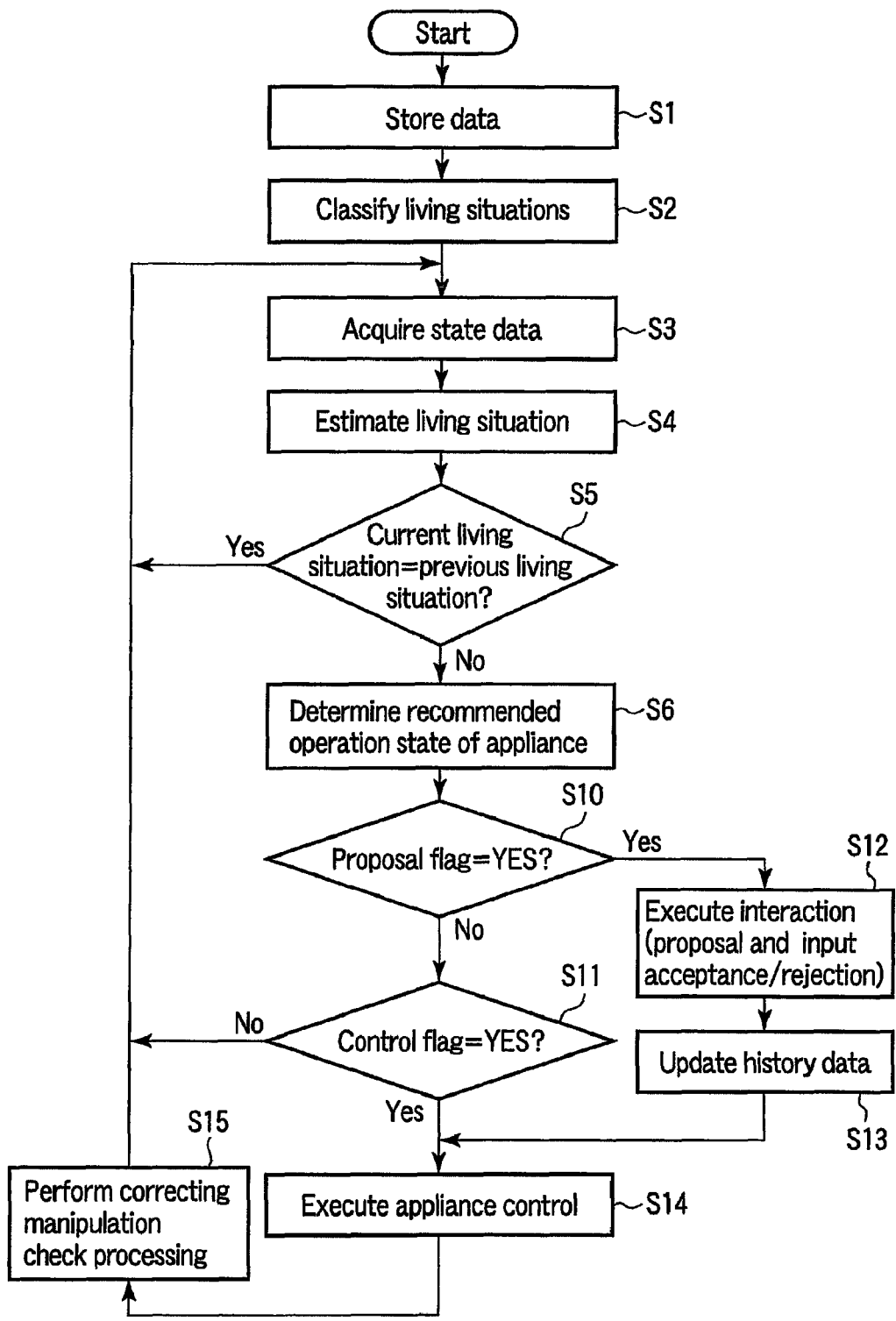
F I G. 12

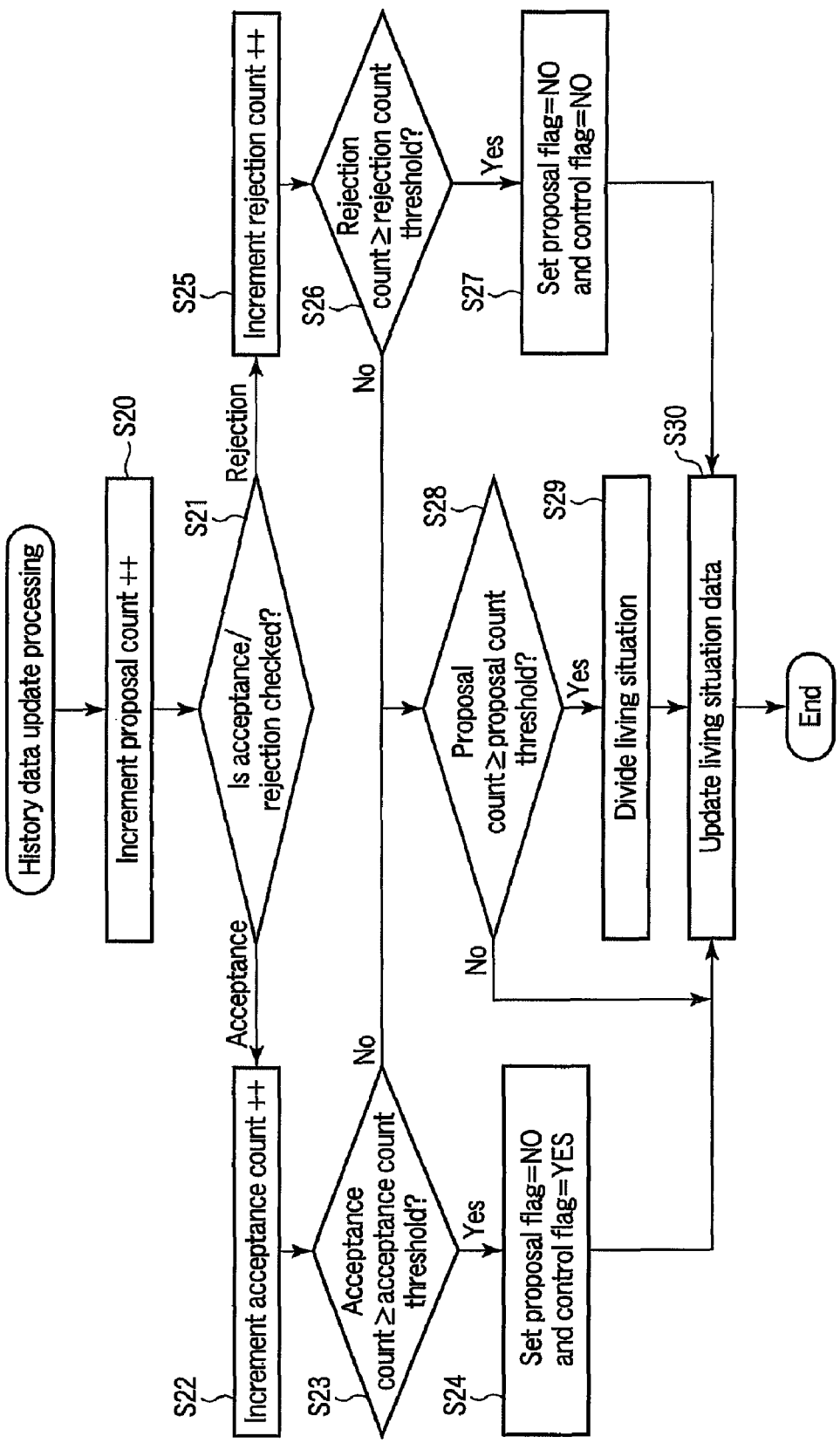
F I G. 15

| | Acceptance/rejection result information concerning proposal | Acceptance | Acceptance | Rejection | Acceptance | Rejection | Rejection | ... |
|---|---|---|---|---|---|---|---|---|
| Appliance operation data | ON/OFF microwave oven | 0 | 1 | 0 | 0 | 0 | 0 | ... |
| | Open/closed state of refrigerator | 1 | 0 | 0 | 0 | 0 | 0 | ... |
| | Washing machine mode | 0 | 0 | 0 | 0 | 0 | 0 | ... |
| | ON/OFF of washing machine | 0 | 0 | 0 | 0 | 0 | 0 | ... |
| | ON/OFF of TV set | 1 | 1 | 1 | 1 | 1 | 1 | ... |
| | Temperature setting (°C) in bedroom air conditioner | 28 | 28 | 28 | 28 | 28 | 28 | ... |
| | ON/OFF of bedroom air conditioner | 0 | 0 | 0 | 0 | 0 | 0 | ... |
| | Temperature setting (°C) in living room air conditioner | 28 | 28 | 28 | 28 | 28 | 27 | ... |
| | ON/OFF of living room air conditioner | 1 | 1 | 1 | 1 | 1 | 1 | ... |
| | ON/OFF of bedroom lighting | 0 | 0 | 0 | 0 | 0 | 0 | ... |
| | ON/OFF of restroom lighting | 0 | 0 | 1 | 0 | 0 | 0 | ... |
| | ON/OFF of bathroom lighting | 0 | 0 | 0 | 0 | 1 | 1 | ... |
| | ON/OFF of kitchen lighting | 1 | 1 | 0 | 0 | 0 | 0 | ... |
| | ON/OFF of living room lighting | 1 | 1 | 1 | 1 | 1 | 1 | ... |
| Position data | Bedroom | 0 | 0 | 0 | 0 | 0 | 0 | ... |
| | Restroom | 0 | 0 | 1 | 0 | 0 | 0 | ... |
| | Bathroom | 0 | 0 | 0 | 0 | 1 | 1 | ... |
| | Kitchen | 1 | 1 | 0 | 0 | 0 | 0 | ... |
| | Living room | 1 | 1 | 1 | 1 | 1 | 1 | ... |
| Environmental data | Living room humidity (%) | 82 | 82 | 64 | 64 | 64 | 64 | ... |
| | Living room temperature (°C) | 31 | 31 | 28 | 28 | 28 | 28 | ... |
| | Proposal data number | 1 | 2 | 3 | 4 | 5 | 6 | ... |

F I G. 16

APPLIANCE CONTROL APPARATUS AND METHOD

CROSS-REFERENCE TO RELATED APPLICATIONS

This application is based upon and claims the benefit of priority from prior Japanese Patent Application No. 2008-139550, filed May 28, 2008, the entire contents of which are incorporated herein by reference.

BACKGROUND OF THE INVENTION

1. Field of the Invention

The present invention relates to an appliance control method and apparatus for implementing environmental load reduction and energy saving.

2. Description of the Related Art

A survey conducted by the Japan Consumer Information Center reveals that 90% or more of the population is interested in energy saving. It is however said that the energy consumption of the civilian sector is still on the increase, and there is a gap between environmental awareness and behavior.

As measures for energy saving in households, there are two measures, namely improving the performance of energy-consuming appliances and houses and controlling the amount of energy used. Controlling the amount of energy used further includes automatic control by hardware and indirect control by information presentation.

Automatic control by hardware is a technique of implementing energy saving by adjusting an energy-consuming appliance so as to save unnecessary operation based on information from a sensor (e.g., a temperature sensor or a pyroelectric sensor). A simple example of this technique includes a method of switching on and off lighting based on a human detection sensor. This technique also includes a method of turning on a lighting fixture at a necessary illuminance by measuring the position of a person and an illuminance (for example, JP-A 2007-200715 (KOKAI)) and a method of controlling an air-conditioning appliance by measuring the position of a person, a temperature, and a humidity (for example, JP-A 2007-107782 (KOKAI)). There is also available a method of performing power saving control by determining the optimal operation mode of an electronic appliance from its operation state and manipulation state (for example, JP-A 2007-259647 (KOKAI)).

Some conventional appliance control methods and apparatuses sometimes execute inappropriate control against the will of an inhabitant, e.g., turning off lighting in spite of the presence of the inhabitant in a room. Alternatively, the prior art can control only the operation of an appliance which surely performs unnecessary operation so as not to execute inappropriate control.

BRIEF SUMMARY OF THE INVENTION

According to embodiments of the present invention, an appliance control apparatus which controls a plurality of appliances in a living space of a user, the apparatus comprises:

an acquisition unit configured to acquire, at intervals of predetermined time, a state data including values of operation states of the respective appliances;

a state data memory to store the state data as one record, to store a plurality of time-series records;

a classifying unit configured to classify the records stored in the state data memory into a plurality of living situation groups by clustering the records based on the values of operation states in each record, and to calculate, for each living situation group, a barycenter of each operation state from records belonging to the living situation group;

a living situation determination unit configured to determine, for each target state data which is acquired by the acquisition unit, one of the living situation groups to which the target state data belongs, the values of the operation states in each record belonging to the one of the living situation groups are closest to the values of the operation states in the target state data;

an operation determination unit configured to compare a value of each operation state in the target state data with the barycenter of each operation state in the one of the living situation groups to which the target state data belongs, to determine one of the operation states whose value in the target state data is larger than corresponding barycenter in the one of the living situation groups, and to determine the barycenter of the one of the operation states in the one of the living situation groups as a first recommended value of the one of the operation states;

an interface unit configured to present the first recommended value of the one of the operation states, and to obtain an acceptance instruction or a rejection instruction concerning the first recommended value of the one of the operation states which is presented; and an appliance control unit configured to control the one of the operation states to the first recommended value when obtaining the acceptance instruction.

BRIEF DESCRIPTION OF THE SEVERAL VIEWS OF THE DRAWING

FIG. 1 is a block diagram showing an example of the overall arrangement of a system including an appliance control apparatus according to an embodiment of the present invention;

FIG. 3 is a view showing an example of how state data (records) are stored in a state data storage unit;

FIG. 4 is a view showing an example of how living situation data are stored in a living situation data storage unit;

FIG. 5 is a view showing an example of levels assigned to the respective appliances;

FIG. 8 is a block diagram showing an example of the overall arrangement of a system including an appliance control apparatus according to another embodiment of the present invention;

FIG. 9 is a view showing an example of history data stored in a history data storage unit;

FIG. 10 is a flowchart for explaining the processing operation of an appliance control apparatus (FIG. 8) according to the second embodiment;

FIG. 11 is a flowchart for explaining history data update processing;

FIG. 12 is a flowchart for explaining the processing operation of an appliance control apparatus according to the third embodiment;

FIG. 15 is a flowchart for explaining history data update processing according to the fourth embodiment;

FIG. 16 is a view showing an example of how interaction history data are stored in a history data storage unit.

DETAILED DESCRIPTION OF THE INVENTION

First Embodiment

Figure 2:
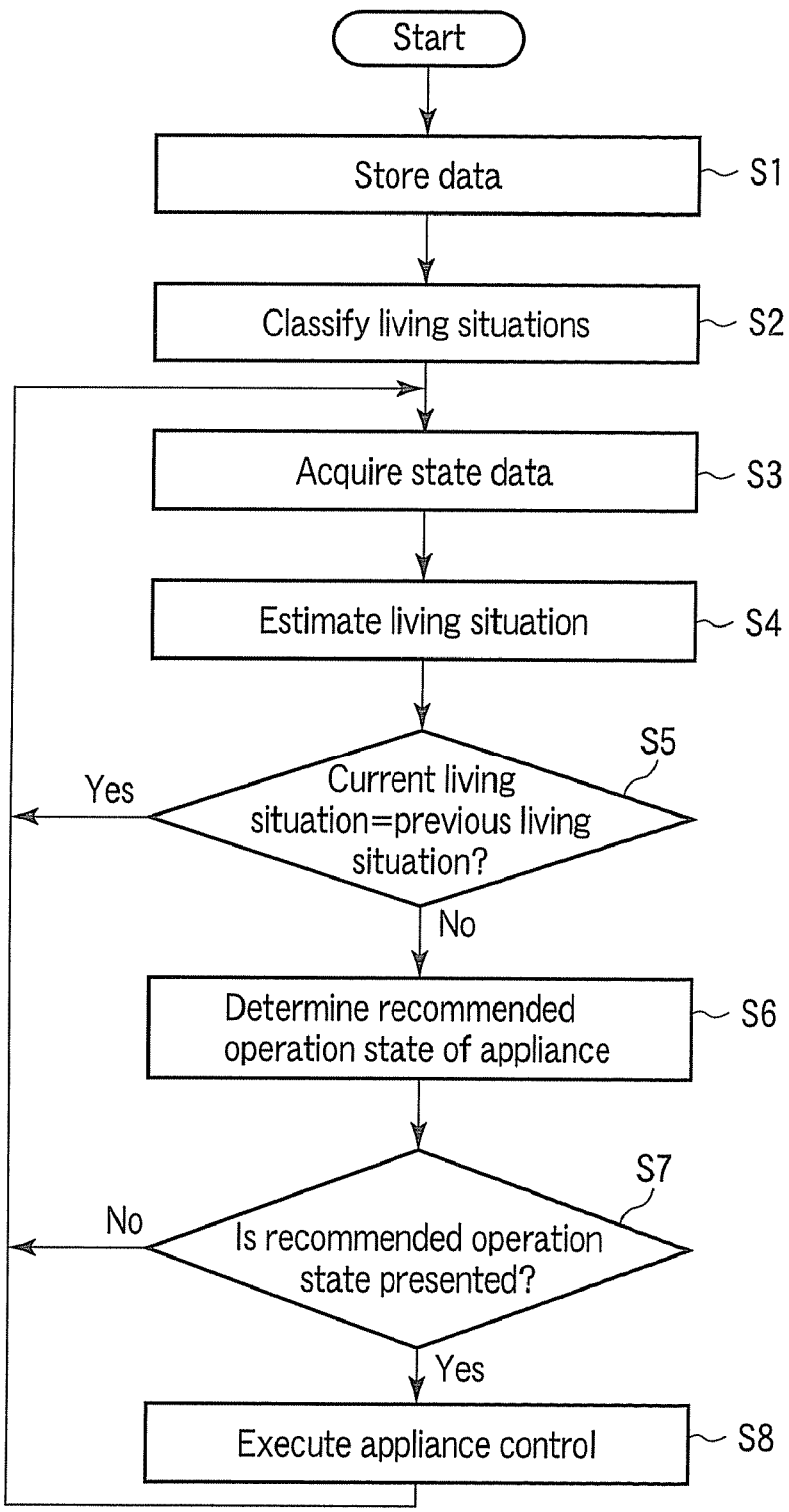
FIG. 2 is a flowchart for explaining the processing operation of an appliance control apparatus according to the first embodiment.

The overall arrangement of a system, which is most basic, and the arrangement and processing operation of an appliance control apparatus 100 will be described with reference to FIGS. 1 and 2.

Referring to FIG. 1, the appliance control apparatus 100 proposes a user (inhabitant) information indicating control on an operation state (recommended operation state) in which each appliance (e.g., a lighting fixture, air-conditioning appliance (air conditioner), TV set, refrigerator, or microwave oven) can save energy in a living space such as a home or an office in accordance with the behavioral style of the user who is living in the space, and performs energy saving control on each appliance.

Referring to FIG. 1, the appliance control apparatus 100 roughly includes a data acquisition unit 1, a state data storage unit 2, a living situation classifying unit 3, a living situation data storage unit 4, a living situation estimation unit 5, an appliance operation determination unit 6, an interface unit 7, and an appliance control unit 8.

The data acquisition unit 1 wirelessly or wiredly acquires information indicating whether power supplies are on or off, values such as a set temperature and an illuminance, and values such as a temperature and a humidity from appliances such as a sensor, an air conditioner, lighting, and a TV set provided in the respective rooms in a house. Each appliance transmits, to the data acquisition unit 1, an ID for identifying the appliance, information indicating with which one of the states of the appliance the corresponding value is associated (i.e., a state type such as a temperature, humidity, power supply, set temperature, illuminance, or operation mode), and the corresponding value.

Upon receiving state data which is transmitted from each appliance and includes the ID of the appliance, a state type, and a corresponding value, the data acquisition unit 1 stores the state data including the acquired state value in the state data storage unit 2 at predetermined time intervals for each state item indicating the ID of the appliance and the state type.

Note that the values of states of appliances which are to be acquired here are values which include values measured by the appliances installed in a living space and which can be acquired and are possessed by the appliances.

State data include a plurality of state items which can be classified into environmental data such as an outdoor temperature and humidity and temperatures and humidities in the respective rooms in the house, the position data of an inhabitant (e.g., a place where the inhabitant is present in the house), and appliance operation data indicating the operation state of each appliance (e.g., an electrical household appliance) installed in each room.

Appliance operation data indicates, for example, a state of each appliance which can be controlled from the appliance control apparatus 100. For example, this data indicates whether the power supply is on or off. If this appliance is a washing machine, this data indicates in which operation mode, e.g., the dehydration/drying mode, the appliance is set. If the appliance is an air conditioner, the data indicates a set temperature. If the appliance is a refrigerator, the data indicates whether the door is open or closed.

The position data of an inhabitant can be obtained by attaching an IC tag to the inhabitant, providing a tag reader near the entrance of each room, and making the data acquisition unit 1 acquire the data read by the tag reader. That is, it is possible to obtain information indicating a presence situation for each room, e.g., information indicating who is present in which room. Alternatively, information indicating a presence situation in each room can be obtained by making the data acquisition unit 1 acquire the measurement data obtained by this human presence sensor.

Environmental data is obtained by installing a temperature sensor, a humidity sensor, or the like at a measurement position. It suffices to acquire, as environmental data, a sound pressure, a precipitation, and a sunshine duration as well as a temperature and a humidity.

The data acquisition unit 1 records, on the state data storage unit 2, state data acquired from each appliance (each appliance from which environmental data, position data, or appliance operation data can be obtained, e.g., a sensor or an electrical household appliance) for each state item at predetermined time intervals, as shown in FIG. 3. Note that the data acquisition unit 1 may select a predetermined usable state item from acquired state data and store the corresponding data in the state data storage unit 2.

In step S1 in FIG. 2, for example, the data acquisition unit 1 compares acquired state data with state data stored in the state data storage unit 2 every minute. If there is a change in value for each state item, the data acquisition unit 1 records the corresponding time and the acquired state data on the state data storage unit 2. Alternatively, it suffices to record all acquired state data every minute or adjust the length of measurement intervals.

Referring to FIG. 3, temperature and humidity values in a living room are recorded as environmental data. As position data, the presence and absence of an inhabitant in each of rooms including a living room, kitchen, bathroom, restroom, and bedroom are recorded in the form of "1" and "0", respectively. As appliance operation data, the ON/OFF state of the lighting in each room, the ON/OFF states of the air conditioners in the living room and the bedroom, and the ON/OFF states of the TV set, washing machine, and microwave oven are recorded in the form of "1" as a value indicating the ON state and "0" as a value indicating the OFF state, respectively. In addition, values indicating set temperatures of the air conditioners, values indicating the open and closed states of the refrigerator (open: 1, closed: 0), and values indicating the operation modes of the washing machine (OFF: 0, washing: 1, dehydration: 2, drying: 3, soft keep operation: 4) are recorded. In FIG. 3, one record (21st dimensional data) including 21 state items is recorded in correspondence with each time.

In step S1 in FIG. 2, the data acquisition unit 1 records, on the state data storage unit 2, state data as one record (including, for example, the above 21 state items) acquired from the respective appliances for a predetermined period of time (e.g., one day, two days, three days, one week, or one month) at predetermined time intervals (e.g., every minute, every several minutes, every several ten minutes, every hour, or every several hours). As a result, a plurality of time-series records are stored in the state data storage unit 2.

The process then advances to step S2, in which the living situation classifying unit 3 clusters M time-series records stored in the state data storage unit 2 to obtain N clusters. Each cluster corresponds to one living situation of an inhabitant. Each record is classified into one cluster, i.e., a living situation group regarded as the same one living situation, by clustering. Each obtained cluster, i.e., data concerning each living situation group, is stored in the living situation data storage unit 4.

The living situation classifying unit 3 clusters the M time-series records stored in the state data storage unit 2 by using, for example, a hierarchical clustering technique. The hierarchical clustering technique is a technique of obtaining a hierarchical structure of clusters by sequentially merging two clusters exhibiting the shortest inter-cluster distance, starting from an initial state in which there are clusters, each including only one record at a given time, equal to the number of records (M in this case), and repeating this clustering operation until all the clusters are merged into one. When M records are classified into a specific number of living situation groups (clusters) by using this technique, since the values in one record differ for the respective state items, it is necessary to normalize the values when calculating inter-cluster distances. In this embodiment, the values in one record are normalized such that the minimum and maximum values for each state item become "0" and "1", respectively. This embodiment uses the hierarchical clustering technique based on the Ward method. However, the present invention is not limited to this.

The living situation classifying unit 3 calculates, for each of obtained clusters (living situation groups), a barycenter and a variance for each state item in records belonging to the cluster. The living situation data storage unit 4 stores these values.

The living situation data of each of clusters (living situation groups) A, B, and C (to be referred to as living situations A, B, and C hereinafter) stored in the living situation data storage unit 4 includes a record group belonging to the cluster and a barycenter and a variance for each state item in the record group belonging to the cluster.

With the above processing, three types of living situations can be extracted from the plurality of time-series records (each record including environmental data, the position data of the inhabitant, and appliance operation data) obtained from the respective appliances in the house.

In the processing in step S3 and the subsequent steps in FIG. 2, the type of current living situation of the inhabitant is estimated from the state data obtained by the data acquisition unit 1 from the respective appliances, based on a plurality of types (for example, three types in this case) of extracted living situations, and the operation states of the appliances suitable for the current living situation (according to the will of the inhabitant) are proposed to promote environmental load reduction and energy saving.

First of all, in step S3, the data acquisition unit 1 acquires environmental data, the position data of the inhabitant, and appliance operation data from each appliance as in step S1 described above, to obtain a target state data including these data acquired.

The process then advances to step S4, in which the living situation estimation unit 5 determines, every predetermined time (e.g., every minute), a specific one of the plurality of types of living situations stored in the living situation data storage unit 4, to which the state data (target state data) obtained by the data acquisition unit 1 and including environmental data, the position data of the inhabitant, and the appliance operation data belongs. That is, a cluster to which the obtained state data belongs is determined. In this determination, the distance between the (target) state data and the living situation data (including a record group) of each living situation data stored in the living situation data storage unit 4 is calculated by using the method of calculating an inter-cluster distance in step S2 described above, and a living situation exhibiting the shortest distance is determined as a living situation (group) to which the (target) state data belongs.

For example, in the case of living situation data including the 21 items shown in FIG. 4, according to the Ward method, a living situation exhibiting the minimum total sum of the squares of the distances between the barycenters of the respective state items in the living situation data and the values of the respective state items in the (target) state data is determined as a living situation to which the state data belongs.

The living situation estimation unit 5 compares the living situation (the living situation to which the state data belongs) determined from the currently obtained state data (target state data) with the living situation determined from the previously obtained state data (step S5). If the current living situation is the same as the previous living situation, the process returns to step S3. If the current living situation differs from the previous living situation, the process advances to step S6.

In step S6, the appliance operation determination unit 6 determines the recommended operation states of the appliances based on the state data obtained in step S3, the living situation determined for the state data in step S4, and living situation data (including a record group) belonging to the living situation.

In this embodiment, as shown in FIG. 5, controllable standards (levels or control values) are assigned to the respective appliances such that smaller values are assigned to the appliances exhibiting smaller environmental load emissions. For example, consider the ON/OFF state of the lighting fixture provided in the living room in the house. In this case, since the environmental load emission in the OFF state is obviously small, two levels, namely "0" and "1" are assigned to OFF and ON, respectively. Consider the set temperatures of the air conditioner installed in the living room. In this case, since the lower the set temperature, the smaller the environmental load emission, a smaller value is assigned as a level with a lower set temperature.

Determination processing for a recommended operation state in the appliance operation determination unit 6 in step S6 will be described with reference to FIG. 6.

Figure 6:
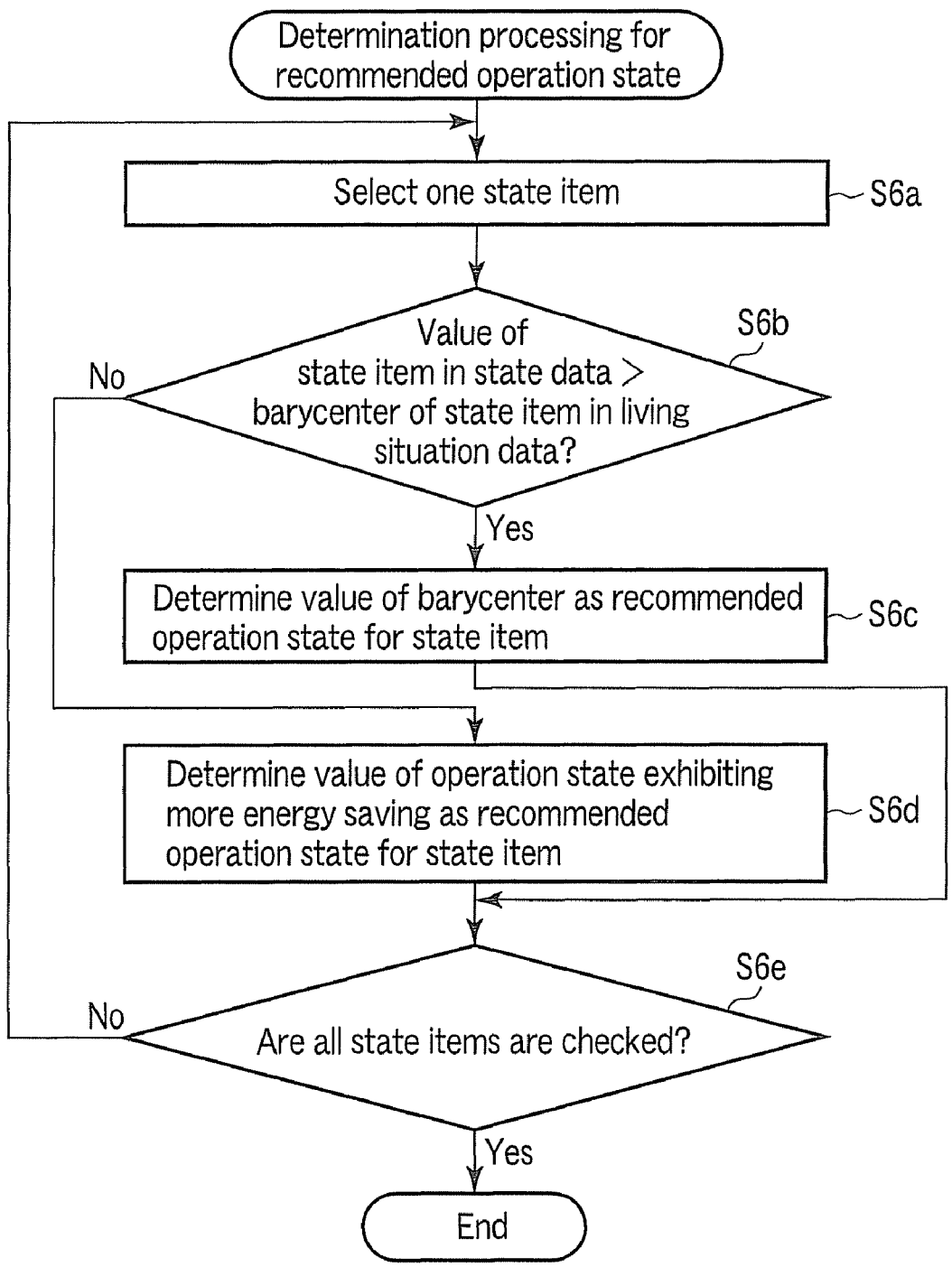
FIG. 6 is a flowchart for explaining determination processing for a recommended operation state in an appliance operation determination unit.

The processing operation in FIG. 6 is performed to check the value of each state item in state data and living situation data. First of all, in step S6a, the appliance control apparatus 100 sequentially selects one state item from a plurality of controllable state items (e.g., state items concerning appliance operation data in this case), and compares the state data with living situation data with regard to the selected state item.

In step S6b, the appliance operation determination unit 6 compares the value of the state item in the state data with the barycenter of the state item in the living situation data to which the state data belongs, with regard to the selected state item in the appliance operation data. If the value of the state data is larger, the appliance corresponding to the state item is an appliance exhibiting wasteful operation, and the process advances to step S6c. Otherwise (if the value of the state item in the state data is equal to or less than the barycenter of the state item in the living situation data to which the state data belongs), the process advances to step S6d.

For example, in the living situation data in FIG. 4, the appliance operation data includes 14 types of state items ranging from the ON/OFF state of the lighting in the living room to the ON/OFF state of the microwave oven. The appliance operation determination unit 6 compares the barycenter value of each state item with the value of the state item in the state data. Assume that the living situation A is determined in step S4 in FIG. 2. In this case, for example, with regard to the state item "the set temperature of the air conditioner in the living room", the barycenter value in the operation state corresponding to the state item is 28° in the data in the living situation A in FIG. 4. In this case, if "the set temperature of the air conditioner in the living room" in the state data is 30°, it can be said that the air conditioner in the living room is an appliance exhibiting wasteful operation in step S6*a* in FIG. 6. In step S6*c*, therefore, as a recommended operation state (a recommended value of an operation state) of the appliance, i.e., the air conditioner, the barycenter value (i.e., 28° in this case) of the state item in the living situation A data is determined.

In step S6*d*, if the record group belonging to the living situation to which the state data belongs includes an operation state requiring more energy saving, an operation state with more energy saving is determined as a recommended operation state of the appliance. This determination method will be described later.

If the value of the state item in the state data is equal to the barycenter of the state item in the living situation data to which the state data belongs, the process advances to step S6*d*, in which it suffices to either inhibit any recommended operation state from being determined for the state item or determine an operation state with more energy saving as a recommended operation state.

The above processing in step S6*a* to step S6*d* is performed for all the state items in the appliance operation data (step S6*e*).

In step S6 in FIG. 2, a recommended operation state is determined for each state item in accordance with the sequence shown in FIG. 6. In step S7, the interface unit 7 presents (proposes) the inhabitant the recommended operation state for each state item determined in step S6 by displaying the information or notifying the inhabitant of the information by sound so as to check whether it is allowed to execute control for setting the state item to the determined recommended operation state.

Note that before the interface unit 7 presents the information, the appliance operation determination unit 6 may check for each state item, based on a condition concerning appliance operation provided in advance, whether to present the recommended operation state. In this case, the appliance operation determination unit 6 stores the condition concerning appliance operation in advance, and the interface unit 7 presents the inhabitant a recommended operation state satisfying the condition in step S7.

The condition concerning appliance operation can be a threshold for a controlled variable. This controlled variable can be determined in advance for each state item or for each appliance. A controlled variable for controlling a given state item to a recommended operation state can be obtained as the difference between the value of the recommended operation state of the appliance and the value of the state item in the currently obtained state data. If this controlled variable exceeds a predetermined threshold determined as a condition concerning appliance operation, the appliance operation determination unit 6 corrects the value of the recommended operation state of the appliance so as to make the controlled variable fall within the threshold, and causes the interface unit 7 to present the corresponding information.

If recommended operation states are determined for a plurality of appliances, the appliance operation determination unit 6 may select a recommended operation state for only a state item or appliance having high priority (e.g., exhibiting a large energy saving effect or a large variance), and may cause the interface unit 7 to present the corresponding information.

As described above, the appliance operation determination unit 6 can select a recommended operation state for a state item which the inhabitant can easily accept, and can cause the interface unit 7 to present the corresponding information.

The interface unit 7 presents a recommended operation state for each state item by displaying or using sound or by a method based on a combination thereof. The inhabitant inputs an instruction to accept or reject this presented control method by, for example, operating (pressing) a mechanical switch provided on the interface unit 7 or making a specific operation or utterance representing acceptance or rejection, which is acquired by a camera or microphone provided on the interface unit 7.

When a recommended operation state is presented, the inhabitant may input one of instructions to accept and reject. Alternatively, only when accepting the method, the inhabitant may input a corresponding instruction. In this case, when the instruction to accept is not input even after the lapse of a predetermined period of time since the presentation of the recommended operation state, it is regarded that the instruction to reject is input. In contrast to this, only when rejecting the method, the inhabitant may input a corresponding instruction. In this case, when the instruction to reject is not input even after the lapse of a predetermined period of time since the presentation of the recommended operation state, it is regarded that the instruction to accept is input.

In step S8 in FIG. 2, the appliance control unit 8 controls the appliance to the recommended operation state accepted by the inhabitant.

The process then returns to step S3, and the above processing in steps S3 to S8 is repeated. This makes it possible to perform energy saving control on each appliance in the house in accordance with the behavioral style of the inhabitant without performing any inappropriate control.

The processing operation of the appliance operation determination unit 6 in steps S6*b* to S6*d* in FIG. 6 will be described in more detail next with reference to FIG. 7.

Figure 7:
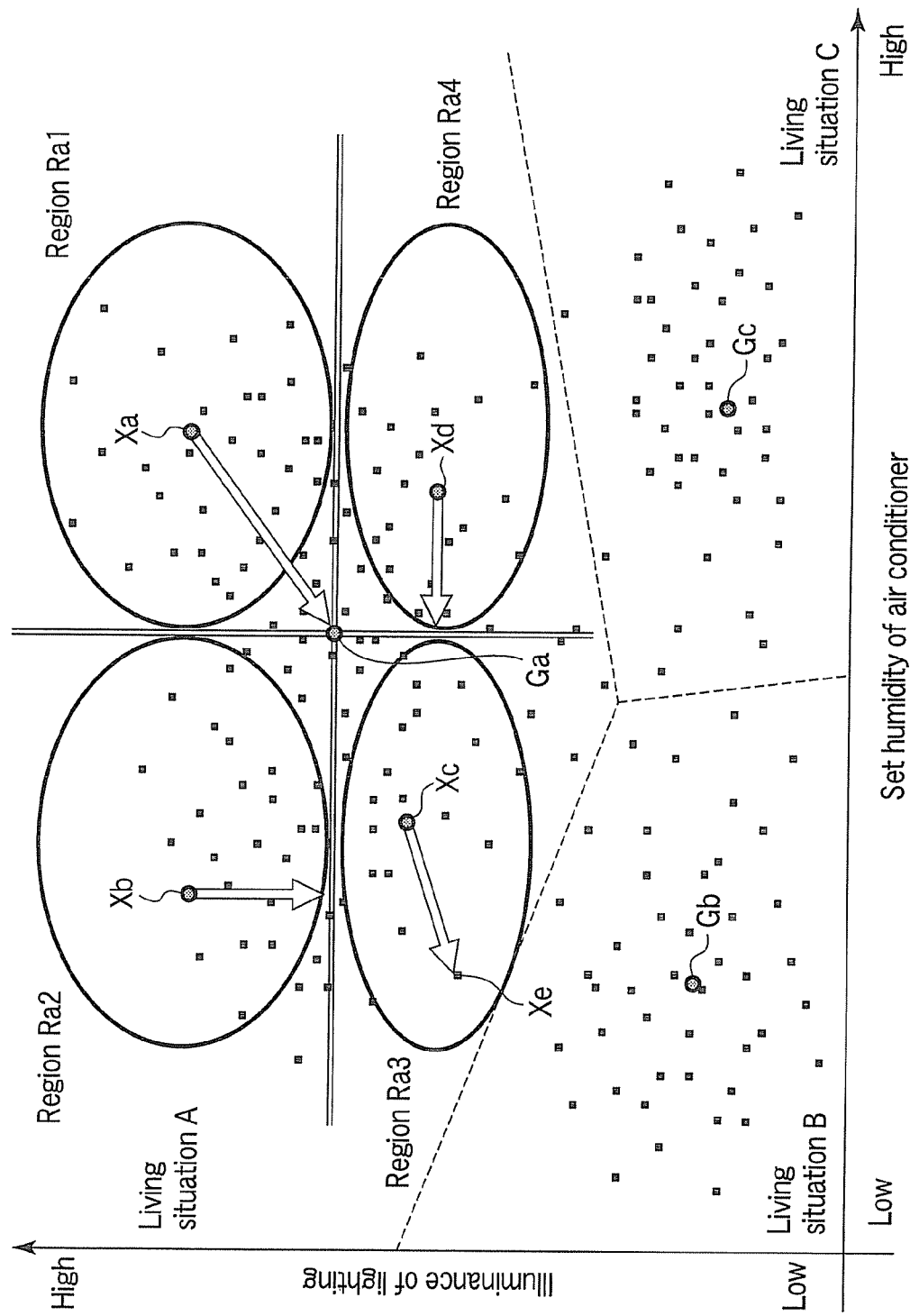
FIG. 7 is a view for explaining a method of determining a recommended operation state.

For the sake of simplicity, FIG. 7 shows a case in which living situation data and state data include the illuminances of the lighting and the set temperatures of the air conditioners, and living situations are classified according to the state data constituted by the two state items.

Referring to FIG. 7, the state item along the ordinate represents the illuminances of the lighting, and the state item along the abscissa represents the set temperatures of the air conditioners. The closer to the origin, the lower the energy of operation states. At each point, a record of the state data at a given point of time is represented by the illuminance of the lighting and the set temperature of the air conditioner. In the case of FIG. 7, the respective points, i.e., the respective records, are classified into a living situation A (corresponding to, e.g., the time of cooking or cleaning) in which the illuminance of the lighting is relatively strong, a living situation B (corresponding to, e.g., the time of bathing or eating) in which both the illuminance of the lighting and the set temperature of the air conditioner are relatively low, and a living situation C (corresponding to, e.g., the time of TV viewing) in which the illuminance of the lighting is relatively low, and the set temperature of the air conditioner is relatively high. FIG. 7 shows barycenters Ga, Gb, and Gc as the representative points of the records belonging to the respective living situations.

FIG. 7 explains a method of controlling appliances when the living situation to which the state data obtained in step S3 belongs is determined as the living situation A in step S4. As shown in FIG. 7, the living situation A is divided into four regions Ra1, Ra2, Ra3, and Ra4 with the barycenter Ga serving as the origin.

If the state data obtained in step S3 corresponds to a point Xa in FIG. 7, the position of the point Xa falls within the region Ra1 of the living situation A (the region in which both the set temperature of the air conditioner and the illuminance of the lighting are higher than those at the barycenter Ga). That is, since the point Xa corresponds to an operation state with an energy consumption higher than that of operation state at the barycenter Ga corresponding to the representative living situation in which both the illuminance of the lighting and the set temperature of the air conditioner belong to the living situation A, the appliance operation determination unit 6 determines the same illuminance and set temperature as those at the barycenter Ga as recommended operation states of the lighting and air conditioner, respectively.

If the state data obtained in step S3 corresponds to a point Xb in FIG. 7, the position of the point Xb falls within the region Ra2 of the living situation A (the region in which the set temperature of the air conditioner is lower than that at the barycenter Ga, but the illuminance of the lighting is higher than that at the barycenter Ga). That is, since the point Xb corresponds to an operation state with the set temperature of the air conditioner being lower in energy consumption than that at the barycenter Ga, but the illuminance of the lighting being higher in energy consumption than that at the barycenter Ga, the same illuminance as that at the barycenter Ga is determined as a recommended operation state of the lighting.

Likewise, if the state data obtained in step S3 corresponds to a point Xd in FIG. 7, the position of the point Xd falls within the region Ra4 of the living situation A (the region in which the illuminance of the lighting is lower than that at the barycenter Ga, but the set temperature of the air conditioner is higher than that at the barycenter Ga). That is, since the point Xd corresponds to an operation state with the illuminance of the lighting being lower in energy consumption than that at the barycenter Ga, but the set temperature of the air conditioner being higher in energy consumption than that at the barycenter Ga, the same set temperature as that at the barycenter Ga is determined as a recommended operation state of the air conditioner.

If the state data obtained in step S3 corresponds to a point Xc in FIG. 7, the position of the point Xc falls within the region Ra3 of the living situation A (the region in which both the illuminance of the lighting and the set temperature of the air conditioner are lower than those at the barycenter Ga). That is, the operation states of the lighting and air conditioner at the point Xc are higher in the degree of energy saving than those at the barycenter Ga, and hence are efficient operation states. In this case, a point Xe representing the record of past state data higher in the degree of energy saving than the operation state at the point Xc (e.g., state data, of past state data higher in the degree of energy saving than that at the point Xc, which exhibits the highest degree of energy saving) is selected, and the same illuminance and set temperature as those at the point Xe are determined as recommended operation states for the lighting and the air conditioner, respectively.

The interface unit 7 proposes the inhabitant the recommended operation state for each state item determined in the above manner. If the inhabitant accepts it, the appliance control unit 8 performs appliance control to set the corresponding state item to the recommended operation state. That is, if the state data corresponds to the point Xa, the appliance control unit 8 sets the lighting and the air conditioner to the same illuminance and set temperature as those at the barycenter Ga. If the state data corresponds to the point Xb, the appliance control unit 8 sets the lighting to the same illuminance as that at the barycenter Ga. If the state data corresponds to the point Xd, the appliance control unit 8 sets the air conditioner to the same set temperature as that at the barycenter Ga. If the state data corresponds to the point Xc, the appliance control unit 8 sets the lighting and the air conditioner to the same illuminance and set temperature as those at the point Xd.

As described above, according to the first embodiment, records including values for the respective state items acquired from a plurality of appliances in a living space are time-serially stored at predetermined time intervals, and the plurality of stored records are clustered based on the values for the respective state items, thereby classifying the plurality of records into a plurality of living situation groups in the living space.

As a living situation group to which the state data which is acquired thereafter and includes a value for each state item (representing the ID of an appliance and the type of state) at a given time belongs, a living situation group in which the value for each state item is closest to the state data is obtained from a plurality of living situation groups, and the value for each state item in the state data is compared with the barycenter of values of the state item which is calculated for the living situation group to which the state data belongs. If the value in the state data is larger than the barycenter, the barycenter is determined as a recommended operation state for the state item.

If this recommended operation state is presented, and an acceptance instruction of acceptance and rejection instructions concerning the recommended operation state is obtained, the appliance is controlled to set the state item to the recommended operation state.

This arrangement promotes environmental load reduction and energy saving, and hence can easily implement appliance control suitable for the current living situation of the inhabitant (according to the will of the inhabitant).

Note that in the first embodiment, when a recommended operation state for a state item is determined in step S6 in FIG. 2, the process may advance to step S8 upon skipping step S7, i.e., without making the interface unit 7 present the recommended operation state (and without checking whether the inhabitant accepts or rejects) so as to perform appliance control for setting the state item to the recommended operation state.

Second Embodiment

In the first embodiment, excessive interactions of proposal of recommended operation states and checks on acceptance/rejection by the interface unit 7 make the inhabitant feels uncomfortable. In order to reduce the frequency of interactions by using check results on the acceptance/rejection of past proposals, control is executed upon omission of interactions if the proposal of a recommended operation state for a specific state item in a specific living situation is likely to be accepted (accepted at a rate equal to or more than a predetermined value). This makes it possible to implement energy saving automatic control in accordance with the behavioral style of the inhabitant.

FIG. 8 is a block diagram showing the schematic overall arrangement of an appliance control apparatus according to the second embodiment. The same reference numerals as in FIG. 8 denote the same parts in FIG. 1, and different portions will be described. That is, the arrangement in FIG. 8 further includes an interaction execution unit 10 and a history data storage unit 11. An interface unit 7 executes interactions with an inhabitant under the control of the interaction execution unit 10. That is, the interface unit 7 presents a recommended operation state for a state item, of the recommended operation states for the respective state items determined by an appliance operation determination unit 6, which is designated by the interaction execution unit 10, and receives an instruction to accept or reject the recommended operation state.

The interaction execution unit 10 stores history data including the interaction result obtained by the interface unit 7 in the history data storage unit 11, as shown in FIG. 9. Note that it is preferable to store history data for each living situation (for example, as history data concerning a living situation A and history data concerning a living situation B). That is, the history data storage unit 11 stores history data like that shown in FIG. 9 for the state data obtained in step S3 for each living situation determined in step S4 as a living situation to which the state data belongs.

As shown in FIG. 9, interaction history data includes, for each state item, the number of times the interface unit 7 has proposed a recommended operation state for the state item (a proposal count), the number of times the inhabitant has accepted the proposal (an acceptance count), and the number of times the inhabitant has rejected the proposal (a rejection count). This data further includes a proposal flag indicating whether an acceptance/rejection check is necessary (YES) or not (NO) and a control flag indicating whether control is executed (YES) or not (NO).

If the proposal flag is "NO" and the control flag is "YES" (the first flag information), this indicates that an appliance control unit 8 can control the appliance to the recommended operation state without presenting (proposing) any recommended operation state.

If the proposal flag is "NO" and the control flag is "NO" (the second flag information), this indicates that the recommended operation state cannot be presented (proposed), and the appliance control unit 8 cannot control the appliance to the recommended operation state.

If the proposal flag is "YES" and the control flag is "NO" (the third flag information), this indicates that the appliance control unit 8 can control the appliance to the recommended operation state when an instruction to accept is obtained after the recommended operation state is presented.

FIG. 10 is a flowchart for explaining the processing operation of the appliance control apparatus in FIG. 8. The same reference numerals as in FIG. 10 denote the same parts in FIG. 2. Portions different from the first embodiment will be described. That is, referring to FIG. 10, when the appliance operation determination unit 6 determines a recommended operation state for each state item in step S6, the interaction execution unit 10 determines one of the operations of executing an interaction, controlling the appliance to the recommended operation state without performing any interaction, and performing neither interaction nor appliance control, based on the proposal flag and the control flag for the state item stored in the history data storage unit 11 (steps S10 and S11).

That is, the process advances from step S6 to step S10. If "YES" is stored in the history data storage unit 11 as a proposal flag for the state item for which a recommended operation state is determined by the appliance operation determination unit 6, the interaction execution unit 10 advances to step S12, in which the interface unit 7 presents the recommended operation state for the state item. If the proposal flag is "NO" in step S10, the process advances to step S1.

If it is determined in step S11 that "YES" is stored in the history data storage unit 11 as a control flag for the state item for which the recommended operation state is determined, the appliance operation determination unit 6 advances to step S14, in which the appliance control unit 8 controls the corresponding appliance so as to set the state item to the corresponding recommended operation state without performing the interaction. If it is determined in step S11 that the control flag is "NO", the appliance control unit 8 determines to perform neither interaction nor appliance control. The process then returns to step S3.

In step S12, the interface unit 7 presents a recommended operation state. When the interface unit 7 receives an instruction to accept or reject this proposal from the inhabitant, the process advances to step S13, in which the interaction execution unit 10 updates the history data in the history data storage unit 11 based on the interaction result obtained by the interface unit 7. That is, the interaction execution unit 10 updates the proposal count, acceptance count, and rejection count concerning the state item corresponding to the recommended operation state, and determines "YES/NO" of the proposal flag and "YES/NO" of the control flag based on the update result. The history data update processing by the interaction execution unit 10 will be described later.

If the inhabitant accepts the proposed recommended operation state as a result of the interaction executed in step S12, the appliance control unit 8 controls the appliance to set the state of the appliance corresponding to the state item to the recommended operation state.

The history data update processing in step S13 in FIG. 10 will be described next with reference to the flowchart of FIG. 11.

First of all, the process advances to step S20 to increment by one the proposal count corresponding to the state item for which a recommended operation state is proposed for an acceptance/rejection check. The process advances to step S21. If an instruction to accept is input from the inhabitant for this proposal, the process advances to step S22. If an instruction to reject is input, the process advances to step S25.

In step S22, the acceptance count corresponding to the recommended operation state for the state item is incremented by "1". If the resultant value (the updated acceptance count) is equal to or more than a predetermined acceptance count threshold (step S23), the process advances to step S24. If it is determined in step S23 that the updated acceptance count is smaller than the threshold, the history data update processing is terminated.

In step S24, the proposal flag and control flag for the state item are respectively set to "NO" and "YES". The history data update processing is then terminated.

In step S25, the rejection count corresponding to the recommended operation state for the state item is incremented by "1". If the resultant value (the updated rejection count) is equal to or more than a predetermined rejection count threshold (step S26), the process advances to step S27. If it is determined in step S26 that the updated rejection count is smaller than the threshold, the history data update processing is terminated.

In step S27, both the proposal flag and control flag for the state item are set to "NO". The history data update processing is then terminated.

Assume that the acceptance count is equal to or more than the threshold after such update processing. In this case, if the appliance operation determination unit 6 determines a recommended operation state for the state item, the interaction execution unit 10 causes the appliance control unit 8 to control the corresponding appliance to set the state item to the recommended operation state without proposing the recommended operation. Assume that the rejection count is equal to or more than the threshold. In this case, even if the appliance operation determination unit 6 determines a recommended operation state for the state item afterward, the interaction execution unit 10 neither proposes the corresponding recommended operation state nor performs appliance control.

As described above, repeating steps S3 to S14 in FIG. 10 can execute energy saving control on appliances in accordance with the behavioral style of the inhabitant without performing any inappropriate control or executing any excessive interactions.

Third Embodiment

In the second embodiment described above, after the appliance control unit 8 controls an appliance to set it to the recommended operation state accepted by the inhabitant (the state item is changed to the recommended operation state (the recommended value)) in step S14 in FIG. 10, if the inhabitant operates the appliance within a predetermined period of time, this operation can be regarded as correcting manipulation for the control on the appliance by the appliance control unit 8.

Figure 14:
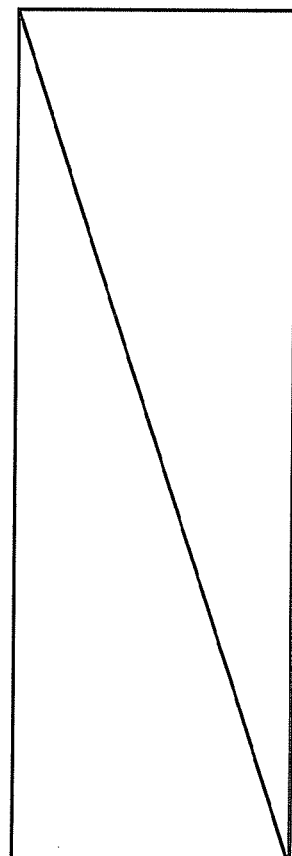
FIG. 14 is a view showing an example of history data according to the third embodiment which includes a correcting manipulation count.

In the third embodiment, as the above history data, the number of times of correcting manipulation by the inhabitant is recorded for each state item of each appliance, as shown in FIG. 14. If this correcting manipulation count is equal to or more than a predetermined count, the history data is initialized to learn energy saving control again. This makes it possible to perform energy saving control more in accordance with the behavioral style of the inhabitant.

The arrangement of an appliance control apparatus 100 according to the third embodiment is the same as that shown in FIG. 8.

FIG. 12 is a flowchart for explaining the processing operation of the appliance control apparatus 100 according to the third embodiment. Note that the same reference numerals as in FIG. 12 denote the same parts in FIG. 10. That is, the flowchart of FIG. 12 additionally includes correcting manipulation check processing in step S15 before the process returns to step S3 after step S14.

Figure 13:
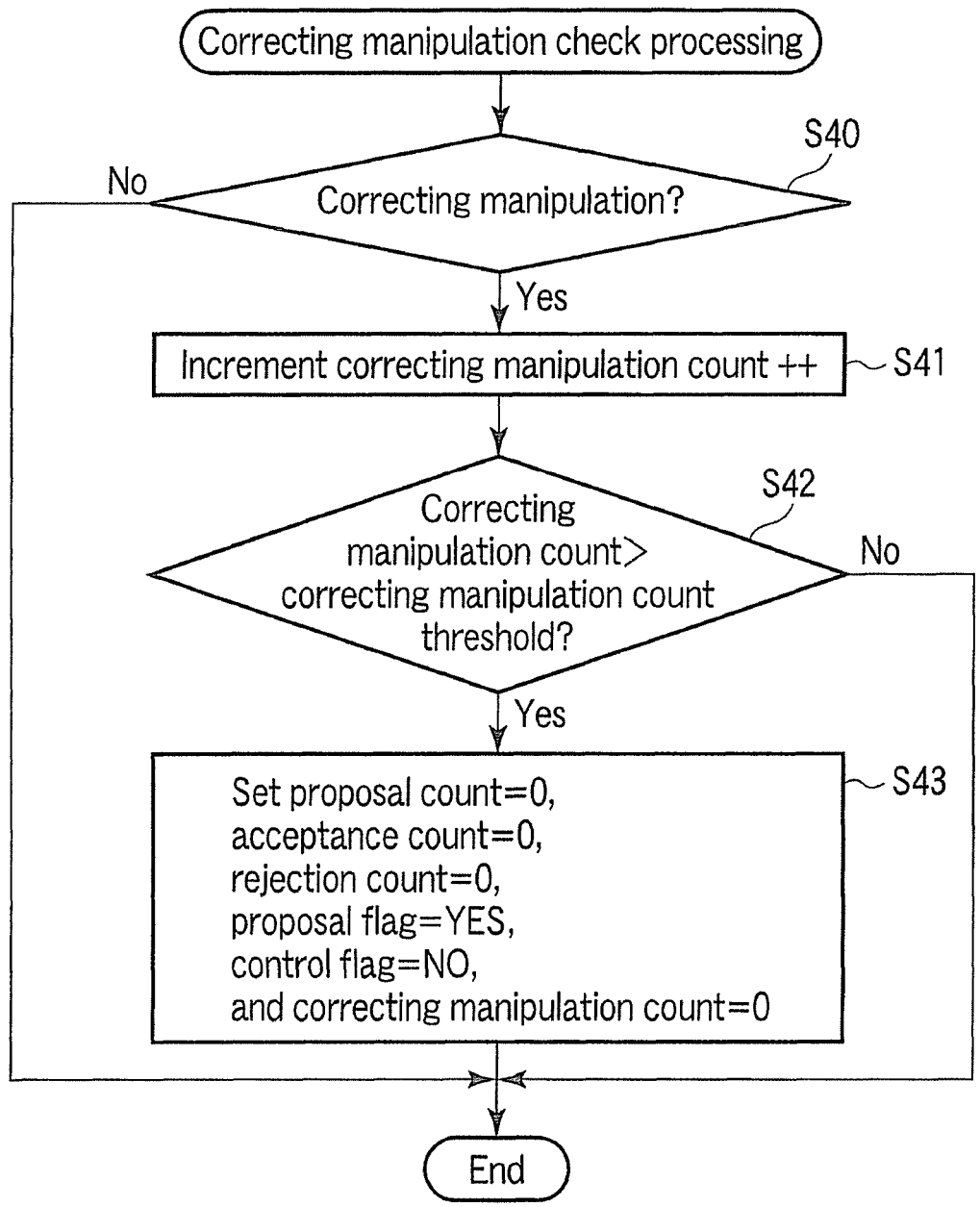
FIG. 13 is a flowchart for explaining correcting manipulation check processing.

The correcting manipulation check processing in step S15 will be described next with reference to the flowchart of FIG. 13.

An interaction execution unit 10 causes the appliance control unit 8 to control the corresponding appliance to set the accepted state item to a recommended operation state (recommended value) in step S14 in FIG. 12, and then changes the value of the state item acquired by a data acquisition unit 1 to the recommended operation state (recommended value). The interaction execution unit 10 can check whether the value of the state item has changed, by checking a state data storage unit 2 at predetermined time intervals α (e.g., every minute or every two or more minutes). After confirming by checking the storage unit at the time intervals α that the state item has changed to the recommended operation state, the interaction execution unit 10 keeps monitoring the state item for a predetermined constant time β (e.g., a time which is longer than the time α and during which when the state item changes in the time β, the change can be regarded as correcting manipulation for the control on the appliance by the appliance control unit 8). For example, the interaction execution unit 10 checks at the time intervals α in the time β whether the state item stored in the state data storage unit 2 has further changed. If a change in the state item is detected within the time β (step S40), the interaction execution unit 10 increments the correcting manipulation count corresponding to the state item in the history data by "1", as shown in FIG. 14 (step S41). If the resultant value (the updated correcting manipulation count) is equal to or more than a predetermined correcting manipulation count threshold (step S42), the process advances to step S43. Note that if it is determined in step S42 that the updated correcting manipulation count is smaller than the threshold, the correcting manipulation check processing is terminated.

In step S43, the interaction execution unit 10 initializes the proposal count, acceptance count, rejection count, and correcting manipulation count corresponding to the state item to "0", and sets the proposal flag to "YES" and the control flag to "NO". Thereafter, the interaction execution unit 10 terminates the correcting manipulation check processing. Subsequently, a recommended operation state which is determined for the state item is presented, and the appliance control unit 8 performs appliance control when obtaining an instruction to accept the recommended operation state.

As described above, according to the third embodiment, if the inhabitant performs the operation of further changing the operation state of an appliance (correcting manipulation) within a predetermined period of time after the appliance control unit 8 executes appliance control to change the appliance (its state item) to a recommended operation state (a recommended value), the number of times of operation (correcting manipulation count) is recorded. If the correcting manipulation count is equal to or more than a predetermined threshold or larger than the threshold, history data is initialized. Thereafter, energy saving control suitable for the behavioral style of the inhabitant is learn again. This makes it possible to perform energy saving control more suitable for the behavioral style of the inhabitant.

Fourth Embodiment

In the second and third embodiments, assume that after a specific living situation is determined in step S4, for the state data acquired in step S3, as a living situation to which the state data belongs, and a recommended operation state for a specific state item is determined in step S6, an interface unit 7 proposes the inhabitant the recommended operation state in step S12. In this case, if the proposal is rejected at a rate equal to or more than a predetermined value, it is highly possible that the classification of the specific living situation is wrong. In the fourth embodiment, therefore, in such a case, the classification of the specific living situation is corrected to classify it more appropriately.

The arrangement of an appliance control apparatus 100 according to the fourth embodiment is the same as that shown in FIG. 8. The processing operation of the appliance control apparatus 100 according to the fourth embodiment is almost the same as that in FIGS. 10 and 12 except for the history data update processing in step S13 (FIG. 11).

FIG. 15 is a flowchart for explaining history data update processing according to the fourth embodiment. Note that the same reference numerals as in FIG. 15 denote the same parts in FIG. 11. That is, the flowchart of FIG. 15 additionally includes processing from step S28 to step S30 for correcting the classification of a living situation if, after the proposal count of a recommended operation state, the acceptance count concerning the proposal, and the rejection count are updated for each state item in the history data stored in a history data storage unit 11, the acceptance count is smaller than the corresponding threshold (step S23) or the rejection count is smaller than the corresponding threshold (step S26).

In this case, history data is stored in the history data storage unit 11 for each living situation. That is, the history data storage unit 11 stores history data like that shown in FIG. 9, for the state data obtained in step S3, for each living situation determined in step S4, as a living situation to which the state data belongs. In this case, therefore, the proposal count, acceptance count, and rejection count concerning each state item in history data concerning one living situation (e.g., a living situation B in this case) determined in step S4 have been updated.

If the acceptance count and the rejection count are equal to or less than the thresholds (steps S23 and S26), the process advances to step S28. If it is determined in step S28 that the proposal count concerning a recommended operation state for the state item is equal or more than a predetermined threshold, it can be estimated that, in the living situation B, the variance of acceptance/rejection concerning the proposed recommended operation state is high, and a plurality of living situations are classified into one living situation B. In this case, the process advances to step S29, in which an interaction execution unit 10 divides the living situation B into a plurality of living situation groups (clusters) by using the acceptance/rejection check result.

In order to divide one living situation group into a plurality of living situation groups, every time the interface unit 7 proposes a recommended operation state, the interaction execution unit 10 stores, in a history data storage unit 11, interaction history data like that shown in FIG. 16 for each living situation determined in step S4 like the above history data, with a proposal data number corresponding to the proposal being attached.

Interaction history data includes state data used to determine the recommended operation state (acquired in step S3) and acceptance/rejection result information indicating the acceptance/rejection result obtained for the proposed recommended operation state (from the interface unit 7).

In step S29, first of all, the interaction execution unit 10 classifies a plurality of interaction history data (state data in them) concerning the living situation B like that shown in FIG. 16, which are stored in the history data storage unit 11, into a set of state data corresponding to the acceptance of the proposals (an acceptance cluster) and a set of state data corresponding to the rejection of the proposals (a rejection cluster) based on the respective pieces of acceptance/rejection result information. As shown in (a) in FIG. 17, as in the case with the living situation classifying unit 3, a barycenter and a variance are then calculated for each state item for each of the acceptance cluster and the rejection cluster. As a result, two living situation data corresponding to each cluster can be obtained.

Note that in this case, it suffices to use the same hierarchical clustering technique as that used by the living situation classifying unit 3. In this case, a living situation need not be divided if the distance between an acceptance cluster and a rejection cluster is equal to or less than a predetermined threshold, and there is no significant difference between the clusters.

Figure 17:
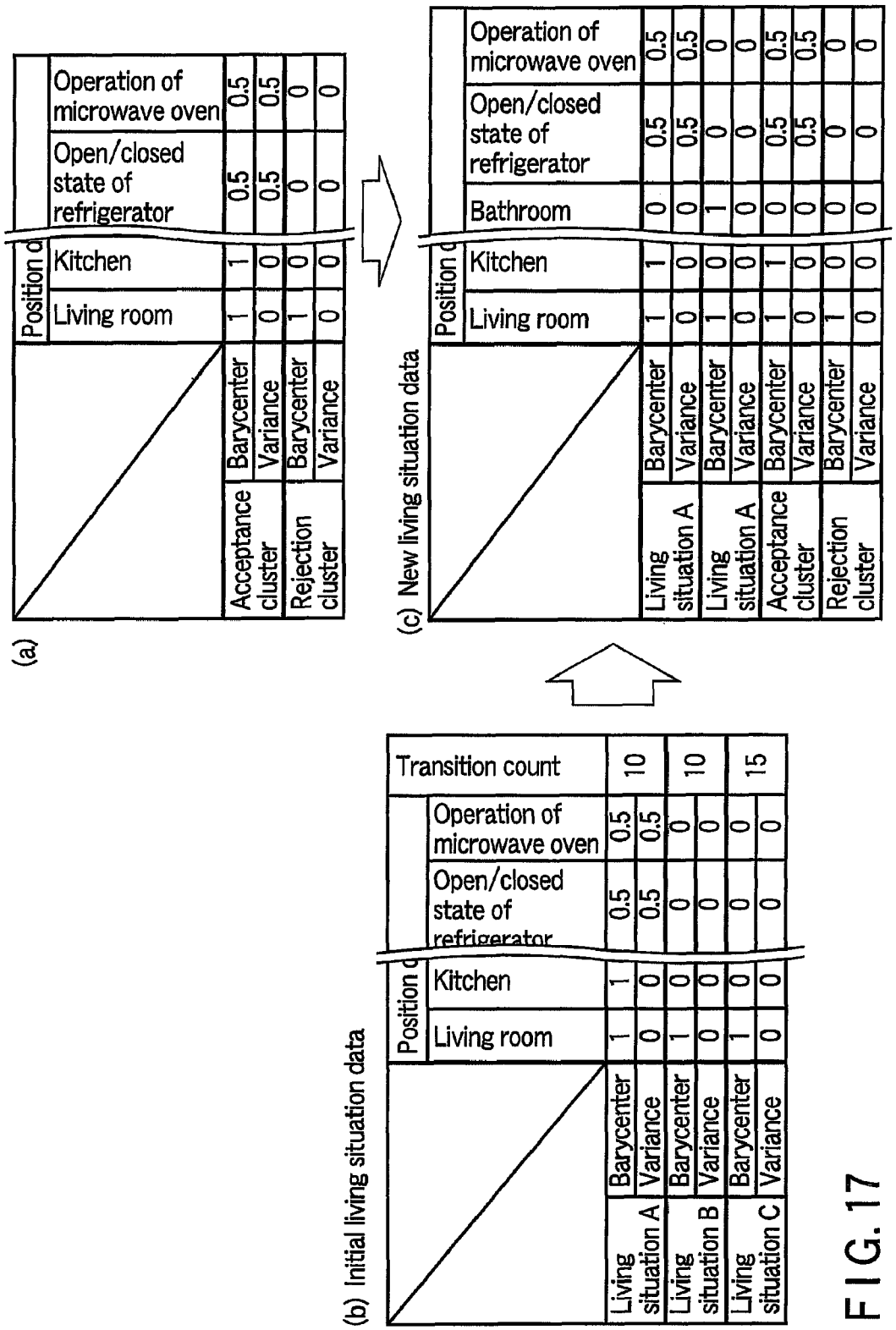
FIG. 17 shows views for explaining a method of dividing a living situation group.

If the living situation B (see (b) in FIG. 17) of the initial living situation data stored in the living situation data storage unit 4 in FIG. 4 is divided into two clusters (an acceptance cluster and a rejection cluster) as described above, and the respective living situation data are obtained (see (a) in FIG. 17), the process advances to step S30.

In step S30, as shown in (c) in FIG. 17, the interaction execution unit 10 rewrites the living situation data of the living situation B stored in the living situation data storage unit 4 with the living situation data of the two clusters (the acceptance cluster and the rejection cluster) in (a) in FIG. 17.

In addition, the plurality of interaction history data of the living situation B are also classified into two living situations (an acceptance cluster and a rejection cluster) based on the respective acceptance/rejection results.

As described above, according to the fourth embodiment, dividing one living situation group into two living situation groups based on acceptances and rejections from an inhabitant concerning a proposed recommended operation state can extract more accurate living situations (groups). It is possible to determine the living situation of the inhabitant more accurately from the obtained state data. It is therefore possible to easily implement appliance control suitable for the current living situation of the inhabitant (according to the will of the inhabitant) to promote environmental load reduction and energy saving.

The techniques of the present invention which are described in the embodiments of the present invention can be distributed as programs which can be executed by computers by being stored in recording media such as magnetic disks (flexible disks, hard disks, or the like), optical disks (CD-ROMs, DVDs, or the like), or semiconductor memories.

That is, the data acquisition unit 1, living situation classifying unit 3, living situation estimation unit 5, appliance operation determination unit 6, interaction execution unit 10, interface unit 7, and appliance control unit 8 can be implemented by causing the processor mounted in the computer apparatus to execute the programs. In this case, the appliance control apparatus can be implemented by installing the above programs in the computer apparatus in advance or by storing the programs in a storage medium such as a CD-ROM or distributing the above programs via a network, and installing the programs in the computer apparatus as needed. In addition, the state data storage unit 2, living situation data storage unit 4, and history data storage unit 11 can be implemented by using a storage medium such as a memory built in or externally connected to the above computer apparatus, a hard disk, a CD-R, a CD-RW, a DVD-RAM, or a DVD-R, as need.

What is claimed is:
1. An appliance control apparatus which controls a plurality of appliances in a living space of a user, the apparatus comprising:
an acquisition unit configured to acquire, at intervals of predetermined time, a state data including values of operation states of the respective appliances;
a state data memory to store the state data as one record, to store a plurality of time-series records;
a classifying unit configured to classify the records stored in the state data memory into a plurality of living situation groups by clustering the records based on the values of operation states in each record, and to calculate, for each living situation group, a barycenter of each operation state from records belonging to the living situation group;
a living situation determination unit configured to determine, for each target state data which is acquired by the acquisition unit, one of the living situation groups to which the target state data belongs, the values of the operation states in each record belonging to the one of the living situation groups are closest to the values of the operation states in the target state data;
an operation determination unit configured to compare a value of each operation state in the target state data with the barycenter of each operation state in the one of the living situation groups to which the target state data belongs, to determine one of the operation states whose value in the target state data is larger than corresponding barycenter in the one of the living situation groups, and to determine the barycenter of the one of the operation states in the one of the living situation groups as a first recommended value of the one of the operation states;
an interface unit configured to present the first recommended value of the one of the operation states, and to obtain an acceptance instruction or a rejection instruction concerning the first recommended value of the one of the operation states which is presented; and
an appliance control unit configured to control the one of the operation states to the first recommended value when obtaining the acceptance instruction.

2. The apparatus according to claim 1, wherein
the operation determination unit is further configured to determine another of the operation states whose value in the target state data is smaller than corresponding barycenter in the one of the living situation groups to which the target state data belongs, and to determine a smallest value of the another of the operation states among records belonging to the one of the living situation groups, as a second recommended value of the another of the operation states;
the interface unit is further configured to present the second recommended value of the another of the operation states, and to obtain an acceptance instruction or a rejection instruction concerning the second recommended value of the another of the operation states, and
the appliance control unit is further configured to control the another of the operation states to the second recommended value when obtaining the acceptance instruction concerning the second recommended value.

3. The apparatus according to claim 1, further comprises:
an interaction execution unit configured to count (a) a proposal count indicating the number of times the interface unit presents the first recommended value of the one of the operation states, (b) an acceptance count indicating the number of times the acceptance instruction is obtained for the first recommended value of the one of the operation states, and (c) a rejection count indicating the number of times the rejection instruction is obtained for the first recommended value of the one of the operation states; and wherein
when the acceptance count is not less than a predetermined first threshold, the interaction execution unit is configured to cause the appliance control unit to control the one of the operation states to the first recommended value without causing the interface unit to present the first recommended value, and
when the rejection count is not less than a predetermined second threshold, the interaction execution unit is configured to cause the interface unit not to present the first recommended value of the one of the operation states, and is configured to cause the appliance control unit not to control the one of the operation states to the first recommended value.

4. The apparatus according to claim 3, wherein further comprises
a history memory; and wherein
the interaction execution unit is further configured (a) to store first flag information in the history memory when the acceptance count is not less than the first threshold, and (b) to store second flag information in the history memory when the rejection count is not less than the second threshold; and wherein
when the first flag information is stored in the history memory, the interaction execution unit causes the appliance control unit to control the one of the operation states to the first recommended value without causing the interface unit to present the first recommended value, and
when the second flag information is stored in the history memory, the interaction execution unit causes the interface unit not to present the first recommended value of the one of the operation states and causes the appliance control unit not to control the one of the operation states to the first recommended value.

5. The apparatus according to claim 4, wherein
the interaction execution unit is further configured to count, within a predetermined period of time after the one of the operation states changes to the first recommended value by control of the appliance control unit, a correcting manipulation count indicating the number of times a value of the one of the operation states acquired by the acquisition unit further changed, and
when the correcting manipulation count is larger than a predetermined third threshold,
the interaction execution unit is further configured to initialize the proposal count, the acceptance count, the rejection count, and the correcting manipulation count to "0", and to store, in the history memory, a third flag information for causing the appliance control unit to control the one of the operation states to the first recommended value when obtaining the acceptance instruction after causing the interface unit to present the first recommended value of the one of the operation states.

6. The apparatus according to claim 3, wherein
the history memory further stores a plurality of target state data each being acquired by the acquisition unit and being determined to belong to the one of the living situation groups, each target state data being stored with information indicating acceptance instruction is obtained or the rejection instruction is obtained when the interface unit presents the recommended value of the one of the operation states; and further comprises:
a dividing unit configured to divide, when the proposal count is not less than a predetermined fourth threshold, and the acceptance count is smaller than the first threshold or the rejection count is smaller than the second threshold, the plurality of target state data belonging to the one of the living situation groups into a first group of target state data with the information indicating the acceptance instruction is obtained and a second group of target state data with the information indicating the rejection instruction is obtained, and to calculate, for each of the first group and the second group, a barycenter of each operation state.

7. The apparatus according to claim 1, wherein the acquisition unit acquires values of various types of operation states of each appliance, which include values measured by the appliances, power supply state of the appliance, and set value of the appliance.

8. An appliance control method for an appliance control apparatus which includes
an acquisition unit configured to acquire, at intervals of predetermined time, a state data including values of operation states of the respective appliances in a living space of a user; and
a state data memory to store the state data as one record, to store a plurality of time-series records;
the method including:
classifying the records stored in the state data memory into a plurality of living situation groups by clustering the records based on the values of operation states in each record;

calculating, for each living situation group, a barycenter of each operation state from records belonging to the living situation group;

obtaining the state data, as a target state data, by the acquisition unit, determining, for the target state data, one of the living situation groups to which the target state data belongs, the values of the operation states in each record belonging to the one of the living situation groups are closest to the values of the operation states in the target state data;

comparing a value of each operation state in the target state data with the barycenter of each operation state in the one of the living situation groups to which the target state data belongs, to determine one of the operation states whose value in the target state data is larger than corresponding barycenter in the one of the living situation groups, and to determine the barycenter of the one of the operation states in the one of the living situation groups, as a first recommended value of the one of the operation states;

presenting the first recommended value of the one of the operation states; and obtaining an acceptance instruction or a rejection instruction concerning the first recommended value of the one of the operation states which is presented;

controlling the one of the operation states to the first recommended value when the acceptance instruction is obtained.

9. The method according to claim 8, wherein
comparing includes determining another of the operation states whose value in the target state data is smaller than corresponding barycenter in the one of the living situation groups to which the target state data belongs, and determining a smallest value of the another of the operation states among records belonging to the one of the living situation groups, as a second recommended value of the another of the operation states;

presenting further presents the second recommended value of the another of the operation states;

obtaining further obtains an acceptance instruction or a rejection instruction concerning the second recommended value of the another of the operation states; and controlling further controls the another of the operation states to the second recommended value when the acceptance instruction concerning the second recommended value.

10. The method according to claim 8, further includes:
counting (a) a proposal count indicating the number of times the first recommended value of the one of the operation states is represented, (b) an acceptance count indicating the number of times the acceptance instruction is obtained for the first recommended value of the one of the operation states, and (c) a rejection count indicating the number of times the rejection instruction is obtained for the first recommended value of the one of the operation states; and wherein when the acceptance count is not less than a predetermined first threshold, the one of the operation states is controlled to the recommended value without presenting the first recommended value of the one of the operation states, and when the rejection count is not less than a predetermined second threshold, the first recommended value of the one of the operation states is not represented, and the one of the operation states is not controlled to the first recommended value.

11. The method according to claim 10, wherein the method further includes:
storing first flag information in a history memory when the acceptance count is not less than the first threshold;

storing second flag information in the history memory when the rejection count is not less than the second threshold; and wherein when the first flag information is stored in the history memory, the one of the operation states is controlled to the first recommended value without presenting the first recommended value, and when the second flag information is stored in the history memory, the first recommended value of the one of the operation states is not presented and the one of the operation states is not controlled to the first recommended value.

12. The method according to claim 10, further includes:
counting, within a predetermined period of time after the one of the operation states changes to the first recommended value by the control, a correcting manipulation count indicating the number of times a value of the one of the operation state acquired by the acquisition unit further changed, and when the correcting manipulation count is larger than a predetermined third threshold,
(a) initializing the proposal count, the acceptance count, the rejection count, and the correcting manipulation count to "0",
(b) storing, in the history memory, a third flag information for controlling the one of the operation states to the first recommended value when obtaining the acceptance instruction after presenting the first recommended value.

13. The method according to claim 10, further includes:
storing, in the history memory, a plurality of target state data each being acquired by the acquisition unit and being determined to belong to the one of the living situation groups, each target state data being stored with information indicating acceptance instruction is obtained or the rejection instruction is obtained when the recommended value of the one of the operation states is represented; and dividing, when the proposal count is not less than a predetermined fourth threshold, and the acceptance count is smaller than the first threshold or the rejection count is smaller than the second threshold, the plurality of target state data belonging to the one of the living situation groups into a first group of target state data with the information indicating the acceptance instruction is obtained and a second group of target state data with the information indicating the rejection instruction is obtained: and calculating, for each of the first group and the second group, a barycenter of each operation state.

* * * * *